US006382343B1

(12) United States Patent
Engler

(10) Patent No.: US 6,382,343 B1
(45) Date of Patent: *May 7, 2002

(54) POWER STEERING APPARATUS

(75) Inventor: Leonard W. Engler, Rochester Hills, MI (US)

(73) Assignee: TRW Inc., Lyndhurst, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/064,864

(22) Filed: Apr. 22, 1998

(51) Int. Cl.[7] ................................................. B62D 5/06
(52) U.S. Cl. ........................ 180/417; 285/305; 285/364; 411/523; 411/524
(58) Field of Search ................................. 285/305, 364, 285/406, 394, 325, 337, 205; 180/434, 437, 442, 417; 411/523, 524; 24/457

(56) References Cited

U.S. PATENT DOCUMENTS

| 4,289,335 A | * | 9/1981 | Olbermann | ................. | 285/364 |
| 4,826,486 A | * | 5/1989 | Palsrok et al. | ............... | 285/364 |
| 4,938,510 A | * | 7/1990 | Gmeiner et al. | ............. | 285/305 |
| 5,046,765 A | * | 9/1991 | Usui | ........................... | 285/305 |
| 5,271,478 A | * | 12/1993 | Minamibata | ................. | 180/437 |
| 5,730,481 A | * | 3/1998 | Szabo et al. | ................. | 285/305 |
| 5,820,168 A | * | 10/1998 | De Gaicomoni | ............ | 285/325 |
| 5,904,221 A | * | 5/1999 | Breiweg et al. | ............. | 180/417 |

* cited by examiner

Primary Examiner—Anne Marie Boehler
(74) Attorney, Agent, or Firm—Tarolli, Sundheim, Covell, Tummino & Szabo L.L.P.

(57) ABSTRACT

A power steering apparatus (10) includes a conduit (50) through which a flow of power steering fluid is conducted and a housing (22) having a chamber (25) which holds power steering fluid. A connector assembly (60) connects the conduit (50) with the housing (22). The connector assembly (60) includes a base (64) which is fixedly connected with the housing (22) and a clip (66) which interconnects the base and the conduit (50). The clip (66) has a pilot portion (76) with cam surfaces (88 and 90) which engage a projection (68) on the conduit (50) to press the conduit into an opening (78) in the base (64) during connection of the conduit with the base. The clip (66) has a retainer portion (74) which cooperates with the base (64) and the projection (68) on the conduit (50) to compress a seal (70) between the projection on the conduit and the base when the conduit is connected with the housing (22).

1 Claim, 3 Drawing Sheets

POWER STEERING APPARATUS

BACKGROUND OF THE INVENTION

The present invention relates to a new and improved power steering apparatus, and more specifically to a power steering apparatus having a connector assembly which connects a conduit with a housing having a chamber which holds power steering fluid.

A known power steering apparatus includes a hydraulic motor having a housing which encloses a cylinder chamber. Power steering fluid under pressure is conducted through a conduit to the cylinder chamber during turning of steerable vehicle wheels in one direction. Power steering fluid is conducted from the cylinder chamber through the conduit during turning of steerable vehicle wheels in the opposite direction. It is desirable to be able to quickly and securely interconnect the conduit and the housing.

A known connection between a conduit for conducting power steering fluid and a housing includes a clip. This known clip engages a connector section fixedly connected with the housing and the conduit to hold the conduit against movement relative to the housing.

SUMMARY OF THE INVENTION

The present invention provides a new and improved power steering apparatus which includes a housing having a chamber to hold power steering fluid. A connector assembly connects a conduit with the housing. The connector assembly includes a base which is fixedly connected with the housing and a clip which interconnects the base and the conduit. To facilitate interconnecting the base and the conduit, the clip has a pilot portion which positions the conduit relative to the base. The pilot portion of the clip has cam surfaces to press the conduit into an opening in the base during connection of the conduit with the base.

BRIEF DESCRIPTION OF THE DRAWINGS

The foregoing and other features of the present invention will become more apparent to one skilled in the art to which the present invention relates upon consideration of the following description of the invention with reference to the accompanying drawings wherein.

DESCRIPTION OF ONE SPECIFIC PREFERRED EMBODIMENT OF THE INVENTION

Figure 1:
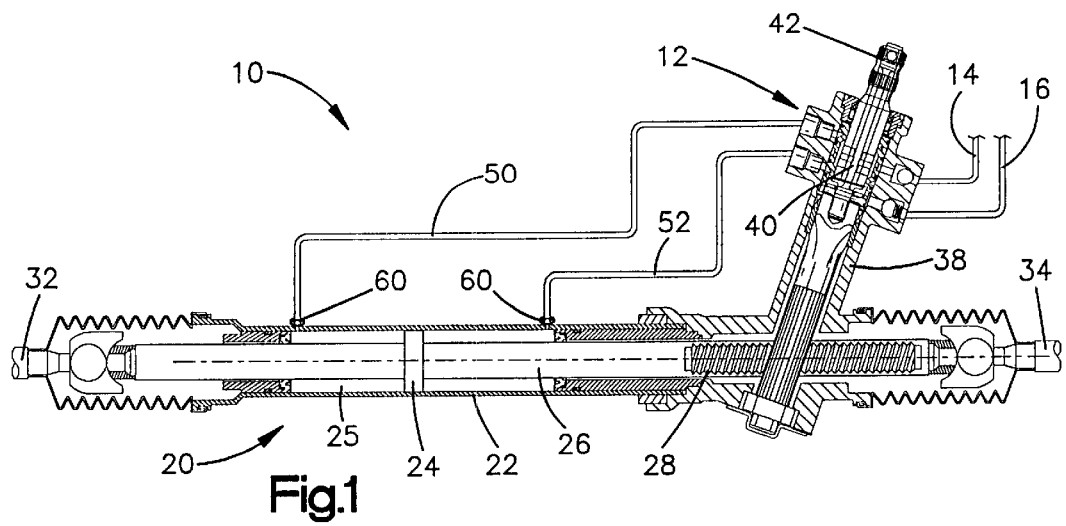
FIG. 1 is a schematic illustration of a portion of a power steering apparatus.

A vehicle power steering apparatus includes a power steering valve 12 which is connected with the outlet of a power steering pump (not shown) by a conduit 14. A second conduit 16 connects the power steering valve 12 with a reservoir for the pump.

The power steering valve 12 controls the flow of fluid to and from a power steering motor 20. Although the power steering motor 20 could have many different constructions, in the illustrated embodiment of the invention, the power steering motor includes a cylindrical housing 22 which encloses a piston 24. The piston 24 is disposed in a cylindrical chamber 25 in the housing 22. The piston 24 is connected with a rack bar 26 on which rack teeth 28 are disposed. Opposite ends of the rack bar 26 are connected with steerable vehicle wheels, in a known manner, by tie rods 32 and 34.

The power steering valve 12 includes a valve housing 38 which encloses a rotatable valve core 40. An input end portion 42 of the valve core 40 is connected with a vehicle steering wheel. Upon rotation of the vehicle steering wheel, the power steering valve 12 is operable to connect either a conduit 50 or a conduit 52 in fluid communication with the outlet from the power steering pump through the conduit 14. The other one of the conduits 50 and 52 is connected with the reservoir through the conduit 16.

The general construction and mode of operation of the power steering apparatus 10 is well known. It is contemplated that the power steering apparatus 10 may have a construction and mode of operation which is generally similar to the construction and mode of operation of the power steering apparatus disclosed in U.S. Pat. Nos. 5,505,276 and 4,276,812.

In accordance with a feature of the present invention, improved connector assemblies 60 are provided to connect the conduits 50 and 52 with the housing 22. Each connector assembly 60 (FIG. 2) includes a base or stud 64 which is fixedly connected to the housing 22. A clip 66 engages the base 64 and a projection 68 on the conduit 50. The clip 66 presses the projection 68 on the conduit 50 against a seal ring 70 to seal a joint between the projection on the conduit and the base 64.

The projection 68 on the conduit 50 has an annular configuration. In the illustrated embodiment of the invention, the projection 68 is integrally formed as one piece with the conduit 50. However, if desired, the projection 68 could be formed separately from the conduit 50 and fixedly connected with the conduit.

The clip 66 (FIG. 3) includes a retainer portion 74 and a pilot portion 76. When the conduit 50 is being connected with the housing 22, the projection 68 is forced downward (as viewed in FIG. 2) into a cylindrical opening or chamber 78 in the base 64 by the pilot portion 76 (FIG. 3) of the clip 66. Once the clip 66 has moved to the position shown in FIGS. 2 and 4 relative to the conduit 50, the retainer portion 74 (FIG. 3) of the clip holds the projection 68 (FIG. 2) on the conduit in the chamber 78 formed in the base 64. This enables the clip 66 to hold the conduit 50 against axial movement relative to the base 64 and housing 22.

Figure 2:
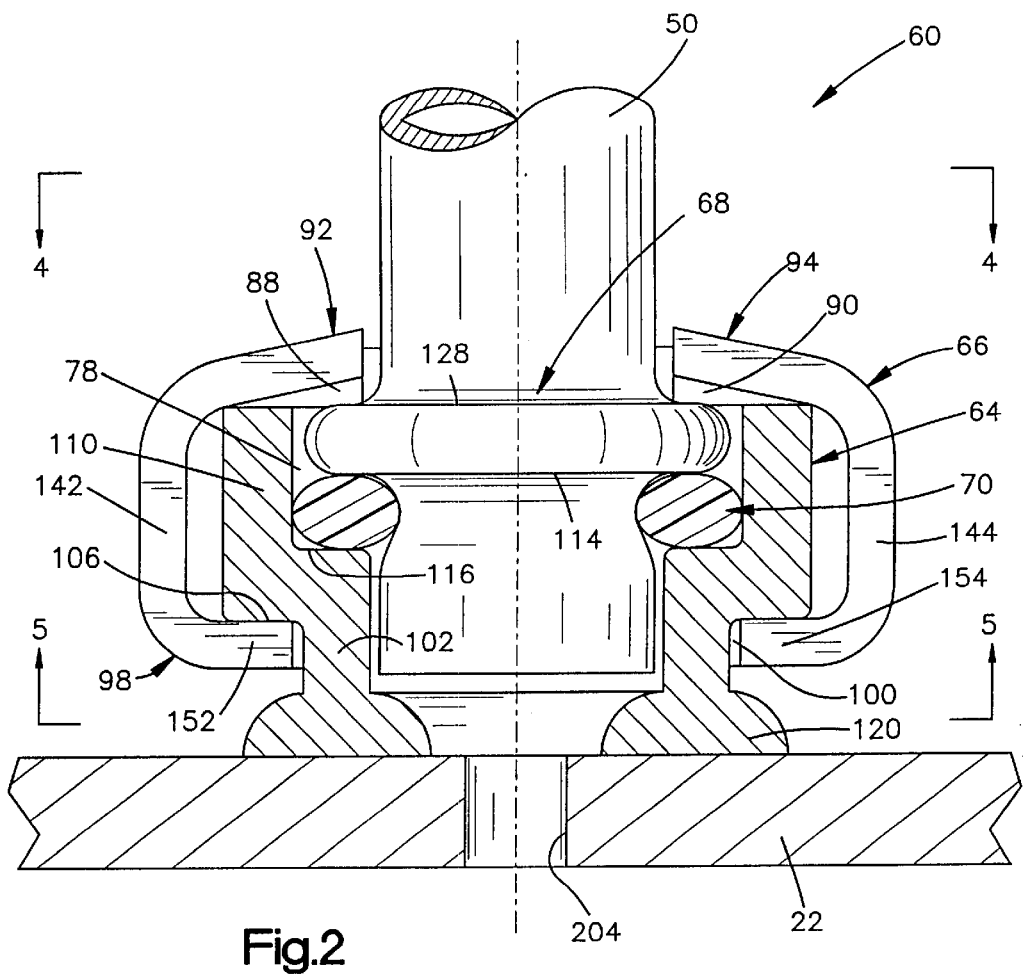
FIG. 2 is an enlarged fragmentary sectional view of a connector assembly which is constructed in accordance with the present invention and connects a conduit with a housing in the power steering apparatus of FIG. 1.

The clip 66 is formed from one piece of stainless steel and has a generally rectangular configuration. The clip includes an outer retainer wall 82 (FIGS. 3 and 4) with a generally U-shaped recess 84 in which the conduit 50 is received, in the manner illustrated in FIG. 4. The pilot portion 76 of the clip 66 includes a pair of outwardly flaring cam surfaces 88 and 90 (FIG. 2). The cam surfaces 88 and 90 are formed on upwardly (as viewed in FIGS. 2 and 3) bent corner portions 92 and 94 of the outer retainer wall 82. The cam surfaces 88 and 90 are skewed at acute angles relative to the outer retainer wall 82.

Figure 3:
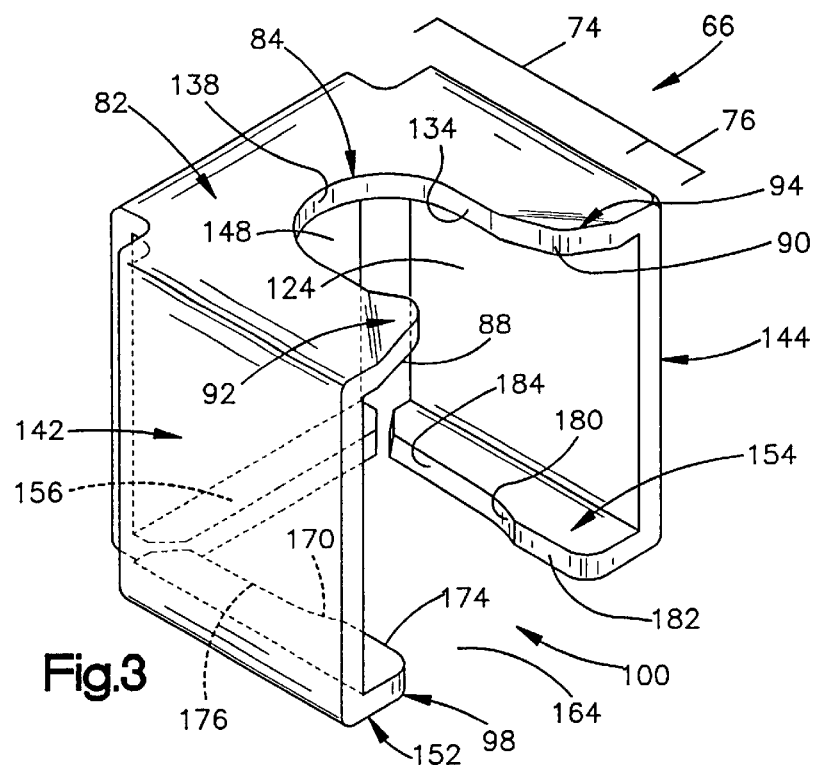
FIG. 3 is a pictorial illustration of a clip which is used in the connector assembly of FIG. 2.

An inner retainer wall 98 (FIGS. 3 and 5) extends parallel to the outer retainer wall 82 (FIG. 3). The inner retainer wall 98 has a generally U-shaped recess 100 (FIG. 5) which is axially aligned with the U-shaped recess 84 (FIG. 3) in the outer retainer wall 82. However, the Ushaped recess 100 in the inner retainer wall 98 is larger than the recess in the outer retainer wall 82.

Figure 5:
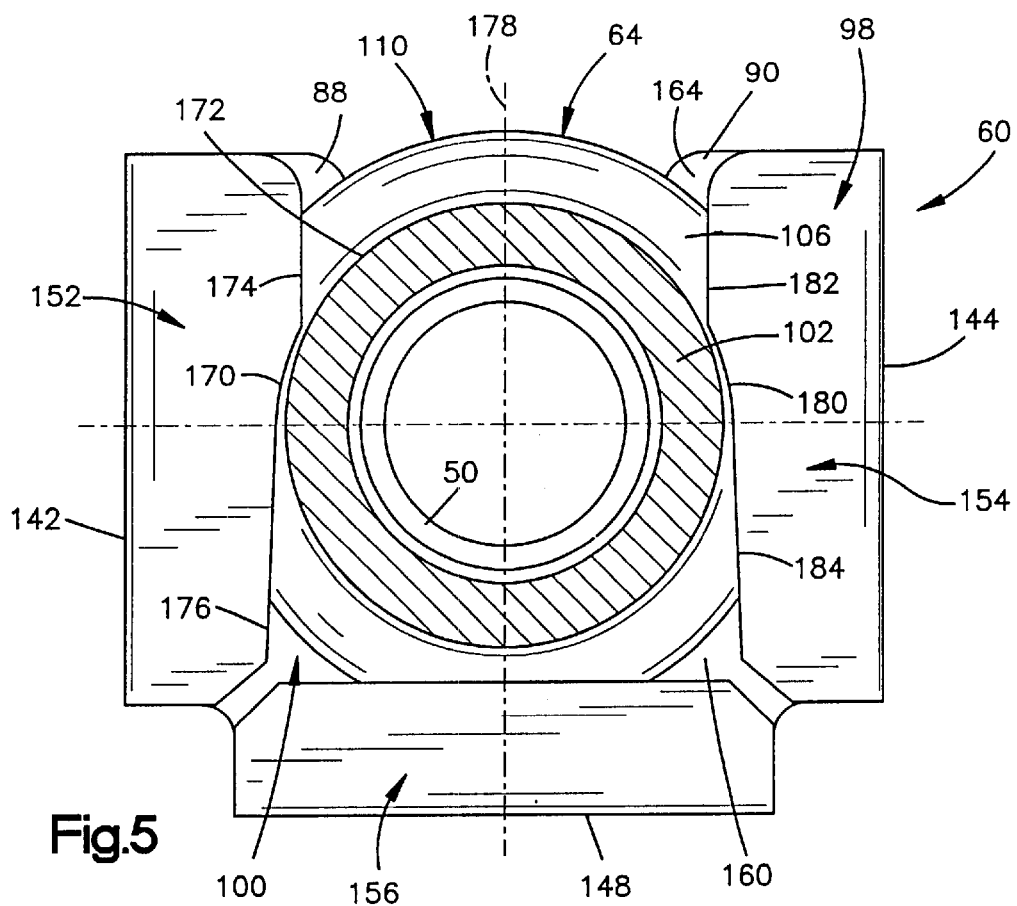
FIG. 5 is a sectional view, taken generally along the line 5—5 of FIG. 2, further illustrating the relationship of the clip to the base.

The U-shaped recess 100 in the inner retainer wall 98 receives a cylindrical stem section 102 of the base 64 (FIGS. 2 and 5). When the clip 66 is in the engaged condition illustrated in FIG. 2, the inner retainer wall 98 presses against an annular downwardly (as viewed in FIG. 2) facing end surface 106 on a cylindrical body 110 of the base 64. This results in the body 110 of the base 64 and the annular projection 68 on the conduit 50 being gripped between the outer retainer wall 82 (FIG. 3) and inner retainer wall 98 of the clip 66.

The seal ring 70 is compressed between an annular inner side surface 114 (FIG. 2) on the projection 66 and an annular bottom surface 116 of the cylindrical chamber 78 in the base 64. Therefore, a joint between the conduit 50 and the base 64 is sealed by the seal ring 70. The base 64 is, itself, fixedly connected to the housing 52 by an annular friction weld 120 (FIG. 2) formed between the stem section 102 of the base 64 and the housing 22. Of course, the base 64 could be connected with the housing 52 in a manner other than welding if desired.

The corner portions 92 and 94 of the outer retainer wall 82, on which the cam surfaces 88 and 90 are disposed (FIG. 3), are located on opposite sides of the U-shaped recess 84 in the outer retainer wall 82. The corner portion 92 of the outer retainer wall 82 is disposed adjacent to the left (as viewed in FIG. 4) side of an open end portion 124 of the U-shaped recess 84. The corner portion 94 on the outer retainer wall 82 is disposed adjacent to the right (as viewed in FIG. 4) side of the open end portion 124 of the U-shaped recess 84. This enables the cam surfaces 88 and 90 (FIG. 3) to engage diametrically opposite portions of the projection 68 (FIG. 2).

Figure 4:
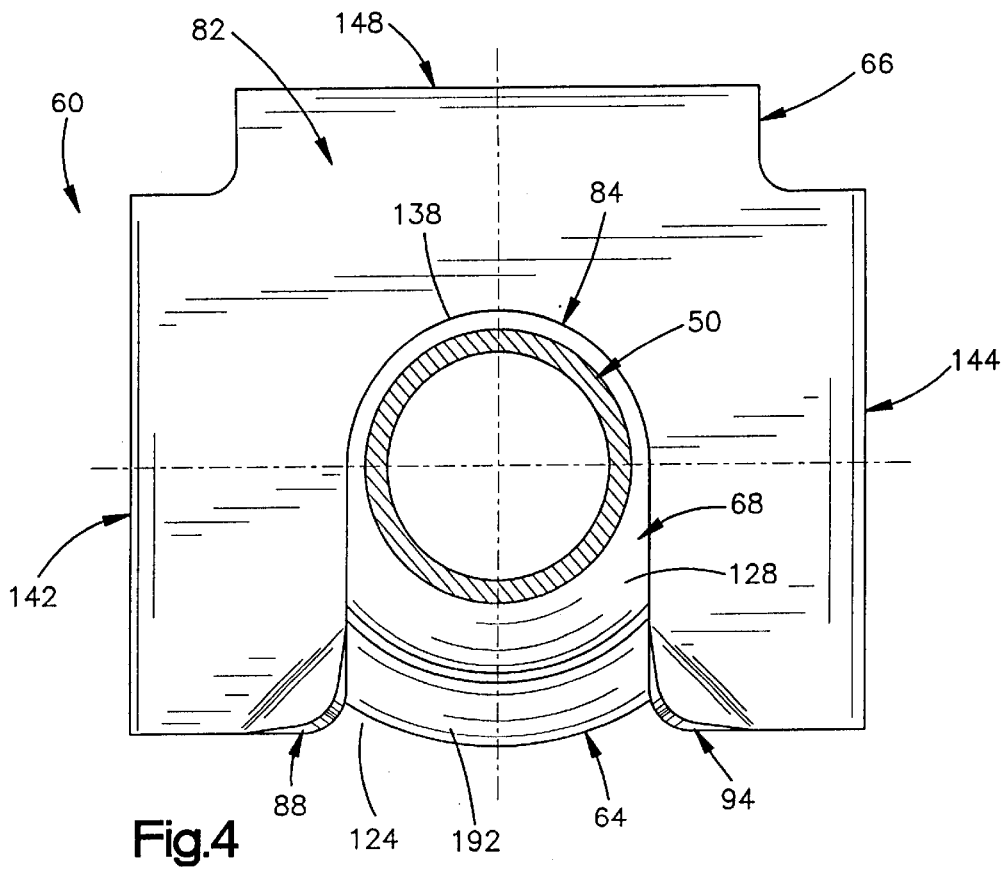
FIG. 4 is a sectional view, taken generally along the line 4—4 of FIG. 2, illustrating the relationship of the clip of FIG. 3 to a base which is fixedly connected with a housing in the power steering apparatus of FIG. 1.

An annular outer side surface 128 (FIG. 2) on the projection 68 extends parallel to the annular inner side surface 114 on the projection. As the clip 66 presses the annular projection 68 on the conduit 50 into the chamber 78 in the base 64, the cam surfaces 88 and 90 apply a downward (as viewed in FIG. 2) force against the outer side surface 128 of the projection 68 to move the projection into the chamber 78. As this occurs, the seal ring 70 is axially compressed against the bottom surface 116 of the base 64. Once the projection 68 has moved into the chamber 78 in the base 64, the outer side surface 128 on the projection slides along a flat inner side surface 134 (FIG. 3) on the outer retainer wall 82. As this occurs, an arcuate closed end portion 138 of the recess 84 moves adjacent to the conduit 50 (FIG. 4).

A side wall 142 extends downward (as viewed in FIG. 3) from the outer retainer wall 82. A second side wall 144 extends downward (as viewed in FIG. 3) from the outer retainer wall 82. The side walls 142 and 144 extend parallel to each other and perpendicular to the outer retainer wall 82. An end wall 148 extends downward from the outer retainer wall 82 and is disposed between the side walls 142 and 144. The end wall 148 extends perpendicular to the outer retainer wall 82 and the side walls 142 and 144.

The inner retainer wall 98 on the clip 66 (FIG. 3) is formed by flanges which extend inward from the side walls 142 and 144 and end wall 148. Thus, a generally rectangular flange 152 extends from an inner end of the side wall 142 in a direction toward the side wall 144. The flange 152 extends parallel to the outer retainer wall 82. Similarly, a generally rectangular flange 154 extends inward from the side wall 144 toward the side wall 142. The flange 154 extends parallel to the outer retainer wall 82 and is aligned with the flange 152 on the side wall 142. A generally rectangular flange 156 extends inward from the end wall 148 toward the flanges 152 and 154. The flange 156 extends parallel to the outer retainer wall 82 and is aligned with the flanges 152 and 154.

The flanges 152, 154 and 156 cooperate to form the inner retainer wall 98 (FIG. 5). In addition, the flanges 152, 154 and 156 define the U-shaped recess 100 in the inner retainer wall 98. In the illustrated embodiment of the invention, the flanges 152, 154 and 156 are not directly connected with each other. However, if desired, corners of the flanges 152, 154 and 156 could be interconnected at an inner end portion 160 of the U-shaped recess 100 in the inner retainer wall 98.

The flanges 152 and 154 are formed in such a manner as to resiliently grip the stem section 102 of the base 64. The flange 152 includes an arcuate edge portion 170 (FIG. 5) which engages a cylindrical outer side surface 172 on the stem section 102 of the base 64. Linear edge portions 174 and 176 extend in opposite directions from the arcuate edge portion 170 of the flange 152. The linear edge portion 174 extends parallel to the linear edge portion 176. However, the linear edge portion 174 is offset from the linear edge portion 176 in a direction toward a longitudinal central axis 178 of the U-shaped recess 100 in the inner retainer wall 98.

Similarly, the flange 154 includes an arcuate edge portion 180 which engages the cylindrical outer side surface 172 of the stem section 102 of the base 64. Linear edge portions 182 and 184 extend in opposite directions from the arcuate edge portion 180. The linear edge portions 182 and 184 extend parallel to each other and to the linear edge portions 174 and 176. However, the linear edge portion 182 is offset from the linear edge portion 184 in a direction toward the longitudinal central axis 178 of the U-shaped recess 100 in the inner retainer wall 98.

The width of the U-shaped recess 100 is less between the parallel linear edge portions 174 and 182 on the flanges 152 and 154 than between the parallel linear edge portions 176 and 184 on the flanges. The relatively wide outer (upper as viewed in FIG. 5) portions of the flanges 152 and 154 grip the stem section 102 of the base 64 to hold the stem section 102 of the base in the U-shaped recess 100 in the inner retainer wall 98.

In the embodiment of the invention illustrated in FIG. 3, the cam surfaces 88 and 90 are formed in the outer retainer wall 82. The flanges 152 and 154 on the inner retainer wall 98 are not bent outward to form cam surfaces, corresponding to the cam surfaces 88 and 90 on the bent corner portions 92 and 94 of the outer retainer wall 82. However, if desired, the corners of the flanges 152 and 154 could be bent downward, as viewed in FIG. 3. This would result in the formation of cam surfaces adjacent to an open end portion 164 of the U-shaped recess 100 in the inner retainer wall 98.

In the illustrated embodiment of the invention, the clip 66 is integrally formed as one piece of stainless spring steel. However, if desired, the clip 66 could be formed of one or more pieces which are fixedly interconnected. Although it is preferred to form the clip 66 by stamping and bending flat sheet material, the clip 66 could be formed in a different manner if desired. For example, the clip 66 could be cast as one piece.

Figure 6:
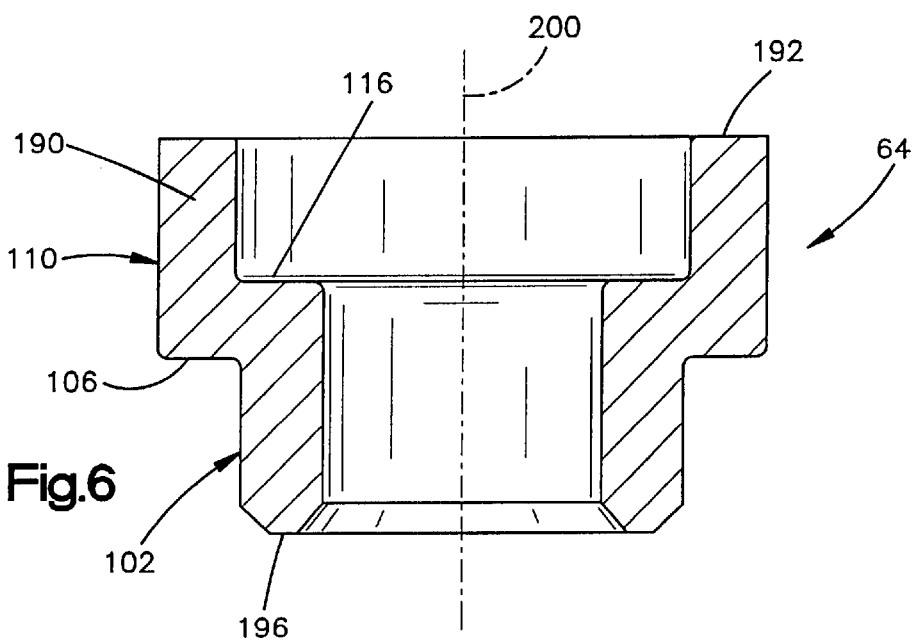
FIG. 6 is a sectional view illustrating the construction of the base to which the clip connects the conduit.

The base 64 is illustrated in FIG. 6 before being connected with the housing 22 in the manner shown in FIG. 2. The base 64 (FIG. 6) includes a cylindrical side wall 190 which is disposed in a coaxial relationship with the cylindrical stem section 182. The side wall 190 has a flat annular end surface 192 which defines a circular opening to the cylindrical chamber 78 in the base 64. The stem section 102 has an axially tapered annular end portion 196.

When the base 64 is to be connected with the housing 22, in the manner illustrated in FIG. 2, the end portion 196 of the stem section 102 is positioned in abutting engagement with the side wall 22 of the housing. At this time, a longitudinal central axis 200 of the base 64 extends through the center of a cylindrical opening 204 in the housing 22. The cylindrical opening 204 in the housing 22 has a diameter which is less than the inside diameter of the stem section 102 of the base 64.

The base 64 is then rotated about its central axis 200. As this occurs, the base 64 is pressed against the housing 22 and the annular friction weld 120 is formed between the 64 and the housing 22. The annular friction weld 120 has an inside diameter which is greater than the diameter of the cylindrical opening 204 in the housing 22. Therefore, hydraulic fluid can readily flow through the conduit 50 into the housing 22 through the cylindrical opening 204.

In the embodiment of the invention illustrated herein, the base 64 is integrally formed from one piece of steel on a cold header type machine. Of course, the base 64 could be formed in a different manner. For example, the base 64 could be cast if desired.

During construction of the power steering apparatus 10, the base 64 is friction welded to the housing 22 in the manner previously explained. The seal ring 70 is then inserted into the chamber 78 in the base 64 (FIG. 2). The annular projection 68 on the conduit 50 is moved part way into the chamber 78 in the base 64.

The clip 66 is then slid into position on the base 64. As the clip 66 is moved onto the base 64, the cam surfaces 88 and 90 on the clip 66 are pressed against the annular projection 68 on the conduit 50. At this time, the flanges 152 and 154 on the clip 66 are disposed in abutting engagement with the end surface 106 on the base 64.

Force is then applied against the clip 66 to cause the cam surfaces 88 and 90 to move the annular projection 68 on the conduit 50 downward (as viewed in FIG. 2). The annular projection 68 on the conduit 50 moves into the chamber 78 in the base 64. As this occurs, the annular seal ring 70 is resiliently compressed between the bottom surface 116 of the chamber 78 and the inner side surface 114 of the annular projection 68 on the conduit 50.

As the clip 66 moves onto the projection 68 on the conduit 50 and onto the base 64, side surface areas on opposite sides of the U-shaped recess 84 (FIG. 4) in the outer retainer wall 82 slide along spaced apart surface areas on the projection 68. At the same time, side surface areas on opposite sides of the U-shaped recess 100 (FIG. 5) in the inner retainer wall 98 slide along spaced apart surface areas on the end surface 106 of the base 64.

As the clip 66 moves onto the base 64, the flanges 152 and 154 on the clip 66 engage the stem section 102 of the base. The flanges 152 and 154 on the clip 66 are resiliently deflected away from each other by engagement of the cylindrical outer side surface 172 (FIG. 5) on the stem section 102 with the linear edge portions 174 and 182 of the flanges 152 and 154. As the clip 66 continues to move onto the base 64, the stem section 102 of the base snaps into the space between the arcuate edge portions 170 and 180 of the flanges 152 and 154. At the same time, the conduit 50 moves to a position adjacent to the arcuate closed end portion 138 (FIG. 4) of the recess 84 in the outer retainer wall 82. At this time, the clip 66 is held against movement relative to the base 64 by the flanges 152 and 154 which grip opposite sides of the stem section 102 of the base. The outer retainer wall 82 presses the annular projection 68 on the conduit 50 into the chamber 78 in the base 64 to hold the conduit 50 against axial movement relative to the base.

If desired, the clip 66 could have a different orientation relative to the base 64. Thus, the inner retainer wall 98 could be positioned in engagement with the projection 68 on the conduit 50 and the outer retainer wall 82 could be positioned in engagement with the end surface 106 on the base 64. Although only the connector assembly 60 for the conduit 50 has been illustrated in FIGS. 2–6. It should be understood that the connector assembly for the conduit 52 has the same construction.

From the above description of the invention, those skilled in the art will perceive improvements, changes and modifications. Such improvements, changes and modifications within the skill of the art are intended to be covered by the appended claims.

Having described the invention, the following is claimed:

1. A power steering apparatus comprising:

a housing defining a chamber for holding power steering fluid;

a conduit for conducting power steering fluid, said conduit having a projection; and a connector assembly for connecting said conduit with said housing, said connector assembly including a base fixedly connected with said housing and a clip which is movable onto said conduit and said base to interconnect said base and said conduit, said base having an opening in fluid communication with said chamber, said clip comprising a first retainer wall having a uniform thickness and a generally rectangular shape defined by four outer edge surfaces, a U-shaped recess extending into said first retaining wall from a first outer edge surface, said U-shaped recess being defined by a closed end portion and first and second inner side surfaces, said first and second inner side surfaces extending perpendicular to and connecting with said first outer edge surface, an open end portion of said U-shaped recess being defined between first and second upwardly bent corner portions of said first retaining wall, said first upwardly bent corner portion being defined by a first upwardly bent portion of said first outer edge surface and an upwardly bent portion of said first inner side surface and said second upwardly bent corner portion being defined by a second upwardly bent portion of said first outer edge surface and an upwardly bent portion of said second inner side surface such that said first and second upwardly bent corner portions are generally triangular, said first and second upwardly bent corner portions of said first retaining wall forming a portion of said first retaining wall for engaging said projection on said conduit and moving said projection on said conduit into said opening in said base during movement of said clip onto said conduit and said base;

said clip further including an end wall and first and second side walls, said end wall being connected with and extending transversely to a second outer edge surface of said first retaining wall, said second outer edge surface being opposite said first outer edge surface, said first side wall being connected with and extending transversely to a third outer edge surface of said first retaining wall, and said second side wall being connected with and extending transversely to a fourth outer edge surface of said first retaining wall, side fourth outer edge surface being opposite said third outer edge surface;

a first flange being connected with and extending transversely to said first side wall and parallel to said first retaining wall, a second flange being connected with and extending transversely to said second side wall and parallel to said first retaining wall, and a third flange being connected with and extending transversely to said end wall and parallel to said first retaining wall, said first, second, and third flanges cooperating to at least partially define a second retainer wall which extends parallel to said first retaining wall;

said second retainer wall at least partially defining a second recess, said second recess having a closed end portion and an open end portion, said closed end portion of said second recess having a greater width as measured in a direction perpendicular to a longitudinal central axis of said second recess than said open end portion of said second recess, said clip being flexible under the influence of force applied against said open end portion of said second recess to increase the width of said open end portion of said second recess during movement of said clip onto said conduit and said base.

* * * * *